(12) United States Patent
Ladouceur et al.

(10) Patent No.: US 8,279,183 B2
(45) Date of Patent: Oct. 2, 2012

(54) ELECTRONIC DEVICE INCLUDING TOUCH-SENSITIVE DISPLAY

(75) Inventors: Norman Ladouceur, Waterloo (CA); Jason Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 962 days.

(21) Appl. No.: 12/261,146

(22) Filed: Oct. 30, 2008

(65) Prior Publication Data

US 2010/0110016 A1  May 6, 2010

(51) Int. Cl.
G06F 3/041 (2006.01)
G06F 3/045 (2006.01)
(52) U.S. Cl. .......................................... 345/173; 345/184
(58) Field of Classification Search ........................ None
See application file for complete search history.

(56) References Cited

U.S. PATENT DOCUMENTS

| | | | |
|---|---|---|---|
| 6,388,660 B1* | 5/2002 | Manser et al. | 345/173 |
| 2003/0094354 A1* | 5/2003 | Badarneh | 200/18 |
| 2006/0062626 A1* | 3/2006 | Hamilton et al. | 400/490 |
| 2006/0181515 A1* | 8/2006 | Fletcher et al. | 345/173 |
| 2006/0181517 A1* | 8/2006 | Zadesky et al. | 345/173 |
| 2006/0278715 A1* | 12/2006 | Hamilton et al. | 235/472.01 |
| 2007/0247429 A1* | 10/2007 | Westerman | 345/168 |
| 2007/0275772 A1* | 11/2007 | Moon et al. | 455/575.1 |
| 2008/0202898 A1* | 8/2008 | Cheon et al. | 200/18 |
| 2009/0051657 A1* | 2/2009 | Kim et al. | 345/168 |
| 2009/0207129 A1* | 8/2009 | Ullrich et al. | 345/156 |

FOREIGN PATENT DOCUMENTS

| | | |
|---|---|---|
| EP | 0419145 A1 | 3/1991 |
| EP | 1691263 A1 | 8/2006 |
| GB | 2402105 A | 12/2004 |

OTHER PUBLICATIONS

European Patent Application 08167912.8—Search Report dated Mar. 19, 2009.

* cited by examiner

*Primary Examiner* — Amare Mengistu
*Assistant Examiner* — Antonio Xavier
(74) *Attorney, Agent, or Firm* — Geoffrey deKleine; Borden Ladner Gervais LLP

(57) ABSTRACT

An electronic device includes a base and a touch-sensitive display connected to the base and movable relative thereto. The touch-sensitive display includes a display device and a touch-sensitive input device for detecting touches on the display device. The electronic device also includes a switch actuator disposed between the touch-sensitive display and the base, switches disposed between the touch-sensitive display and the base and moveable relative to the switch actuator from a first position in which only one of the switches is located for actuation by the switch actuator, and a second position in which two of the switches are located for actuation by the switch actuator, and operational components including a processor connected to the display device and the touch-sensitive input device for controlling operation of the display device and the touch-sensitive input device.

13 Claims, 12 Drawing Sheets

ELECTRONIC DEVICE INCLUDING TOUCH-SENSITIVE DISPLAY

FIELD OF TECHNOLOGY

The present disclosure relates to an electronic device with a touch-sensitive display that is moveable relative to a base of the electronic device for providing tactile feedback when in use.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs or smart telephones are generally intended for handheld use and easy portability. Smaller devices are generally desirable for portability. A touch-sensitive display device is particularly useful on such handheld devices as such handheld devices are small and are therefore limited in space available for user input and output devices. Further, the screen content on such devices can be modified depending on the functions and operations being performed.

Touch-sensitive displays are constructed of a display, such as a liquid crystal display, with a touch-sensitive overlay. These touch screen devices suffer from inherent disadvantages relating to user interaction and response, however. For example, such touch screen devices fail to provide user-desirable tactile feedback for positively indicating input. Poor or no tactile feedback causes difficulty in discerning whether or not an intended input has been received and can result in receipt of erroneous input at the device, for example, by additional or double input. An electronic device with a touch-sensitive display that is moveable relative to a base of the device can provide tactile feedback in response to detection of a touch on the touch-sensitive display. Further improvements for tactile feedback and control of such feedback are desirable, however.

BRIEF DESCRIPTION OF THE DRAWINGS

Embodiments of the present disclosure will now be described, by way of example only, with reference to the attached Figures, wherein.

DETAILED DESCRIPTION

Figure 1:
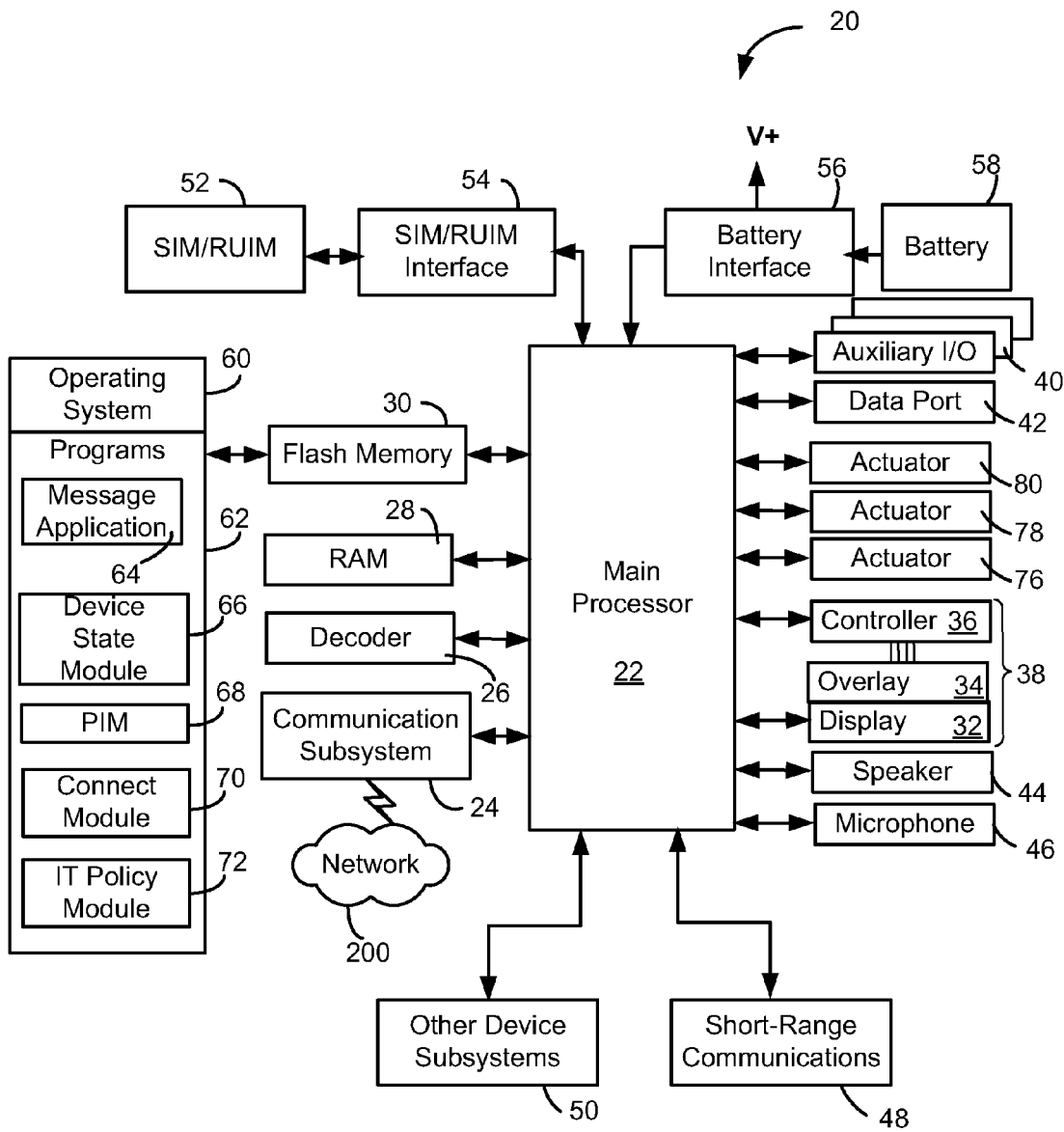
FIG. 1 is a block diagram of certain components, including internal components of an exemplary portable electronic device according to an embodiment.
Figure 2:
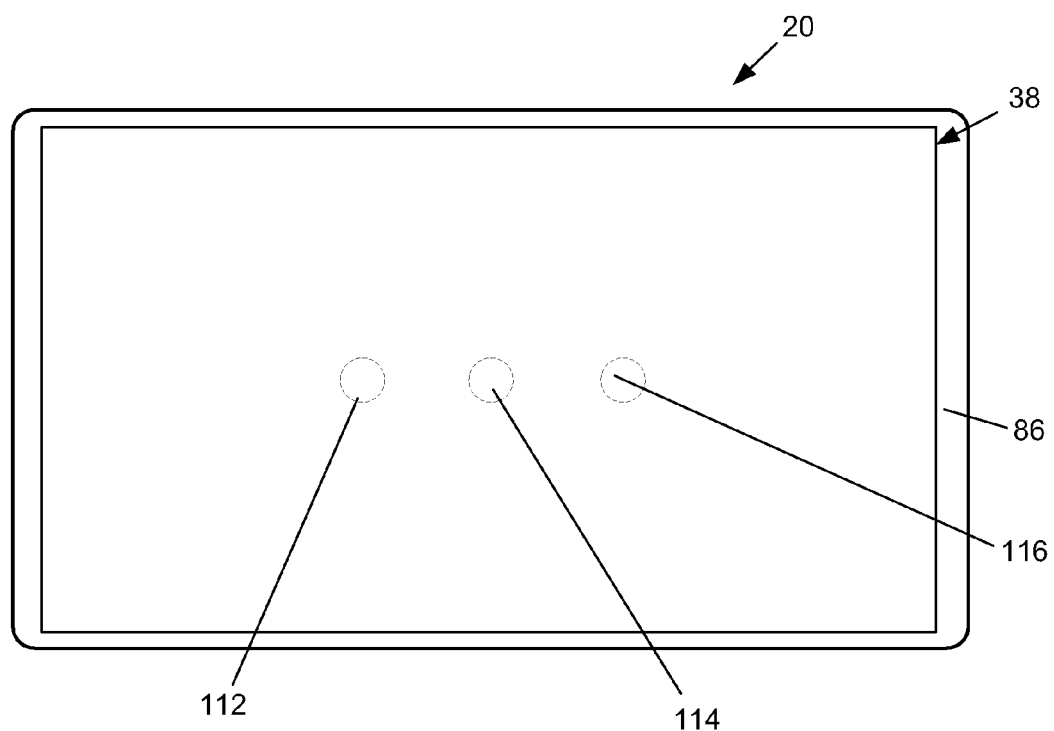
FIG. 2 is a top view of the portable electronic device showing some hidden detail in ghost outline.
Figure 3A:
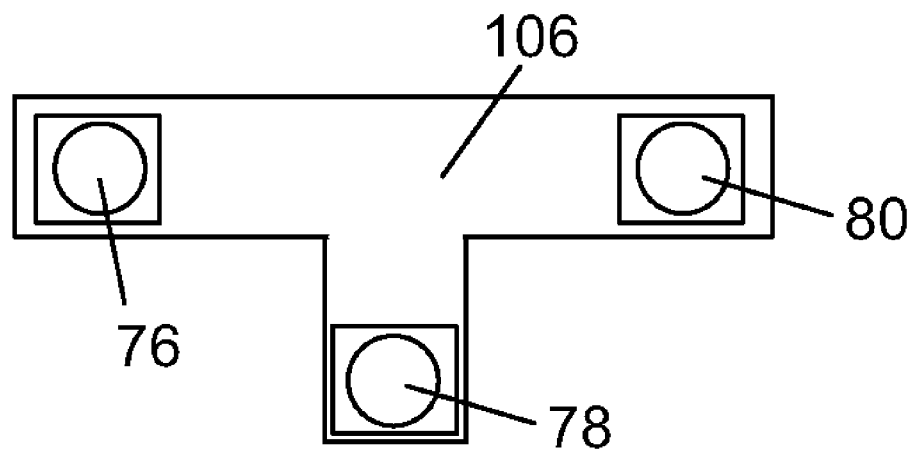
FIG. 3A is a top view of a portion of a sliding mechanism including switches of the portable electronic device of FIG. 2.
Figure 3B:
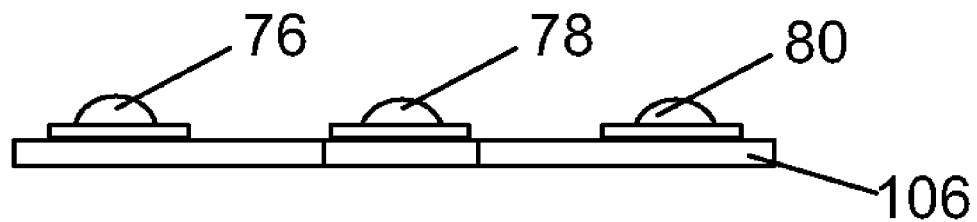
FIG. 3B is a side view of the portion of the sliding mechanism including switches of FIG. 3A.

It will be appreciated that for simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limited to the scope of the embodiments described herein.

The present disclosure generally relates to an electronic device, which in the embodiments described herein is a portable electronic device. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Reference is first made to FIG. 1, which shows a block diagram of an exemplary embodiment of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 200. In this exemplary embodiment of the portable electronic device 20, the communication subsystem 24 is configured in accordance with the Global System for Mobile Communication (GSM) and General Packet Radio Services (GPRS) standards. The GSM/GPRS wireless network is used worldwide. New standards, such as Enhanced Data GSM Environment (EDGE) and Universal Mobile Telecommunications Service (UMTS), are believed to have similarities to the network behavior described herein, and it will also be understood by persons skilled in the art that the embodiments described herein are intended to use any other suitable standards that are developed in the future. The wireless link connecting the communication subsystem 24 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The processor 22 also interacts with additional subsystems such as a Random Access Memory (RAM) 28, a flash memory 30, a display device 32 with a touch-sensitive overlay 34 connected to an electronic controller 36 that together are part of a touch-sensitive display 38, an auxiliary input/output (I/O) subsystem 40, a data port 42, a speaker 44, a microphone 46, short-range communications 48 and other device subsystems 50. The touch-sensitive overlay 34 and the display device 32 provide a touch-sensitive display device 38 and the processor 22 interacts with the touch-sensitive overlay 34 via the electronic controller 36. The processor 22 also interacts with actuators 76, 78, 80 for providing additional input in combination with the touch-sensitive display 38.

Some of the subsystems of the portable electronic device 20 perform communication-related functions, whereas other subsystems may provide "resident" or on-device functions. By way of example, the display device 32 and the touch-sensitive overlay 34 may be used for both communication-related functions, such as entering a text message for transmission over the network 200, and device-resident functions such as calculator or task list functions.

The portable electronic device 20 can send and receive communication signals over the wireless network 200 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 200. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 200 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information Alternatively, user identification information can also be programmed into the flash memory 30.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 to 72 which are described in more detail below. The operating system 60 and the software components 62 to 72 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62 to 72, such as specific device applications, or parts thereof, may be temporarily loaded into a volatile store such as the RAM 28. Other software components can also be included, as is well known to those skilled in the art.

The subset of software applications 62 that control basic device operations, including data and voice communication applications, will normally be installed on the portable electronic device 20 during its manufacture. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software applications can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The portable electronic device 20 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 200, the auxiliary I/O subsystem 40, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 provides for communication between the portable electronic device 20 and different systems or devices, without the use of the wireless network 200. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display device 32 or alternatively to the auxiliary I/O subsystem 40. A subscriber may also compose data items, such as e-mail messages, for example, using the touch-sensitive overlay 34 on the display device 32 that are part of the touch-sensitive display 38, and possibly the auxiliary I/O subsystem 40. The auxiliary subsystem 40 may include devices such as: a mouse, track ball, infrared fingerprint detector, or a roller wheel with dynamic button pressing capability. A composed item may be transmitted over the wireless network 200 through the communication subsystem 24.

For voice communications, the overall operation of the portable electronic device 20 is substantially similar, except that the received signals are output to the speaker 44, and signals for transmission are generated by the microphone 46. Alternative voice or audio I/O subsystems, such as a voice message recording subsystem, can also be implemented on the portable electronic device 20. Although voice or audio signal output is accomplished primarily through the speaker 44, the display device 32 can also be used to provide additional information such as the identity of a calling party, duration of a voice call, or other voice call related information.

Reference is now made to the remaining Figures, which show various views of an exemplary portable electronic device 20, or portions thereof. The portable electronic device 20 includes a base 82 and the touch-sensitive display 38 connected to the base 82 and movable relative thereto. The touch-sensitive display 38 includes the display device 32 and the touch-sensitive overlay 34 as an input device for detecting touches on the display device 32. The portable electronic device 20 also includes a switch actuator disposed between the touch-sensitive display 38 and the base 82, switches 76, 78, 80 disposed between the touch-sensitive display 38 and the base 82 and moveable relative to the switch actuator from a first position in which only one of the switches 76, 78, 80 is located for actuation by the switch actuator, and a second position in which two of the switches 76, 78, 80 are located for actuation by the switch actuator, and operational components including the processor 22 connected to the display device 32 and the touch-sensitive overlay 34 for controlling operation of the display device 32 and the touch-sensitive overlay 34.

Reference is now made to FIGS. 2 to 9 to describe an embodiment of the portable electronic device 20. The portable electronic device 20 according to the present embodiment includes a housing 86 that houses the internal components shown in FIG. 1 and frames the touch-sensitive display 38 such that the touch-sensitive overlay 34 is exposed for user interaction therewith when the portable electronic device 20 is in use. The housing 86 includes a back 88, a frame 90, which frames the touch-sensitive display 38, sidewalls 92 that extend between and generally perpendicular to the back 88 and the frame 90, and a rigid base 82 that is spaced from and generally parallel to the back 88. The base 82 can be any suitable base and can include, for example, a printed circuit board or flex circuit board. The back 88 includes a plate (not shown) that is releasably attached for insertion and removal of, for example, the battery 58 and the SIM/RUIM card 52 described above. It will be appreciated that the back 88, the sidewalls 92 and the frame 90 can be injection molded, for example. In the exemplary portable electronic device 20 shown in FIG. 2, the frame 90 is generally rectangular with rounded corners although other shapes are possible.

Figure 6:
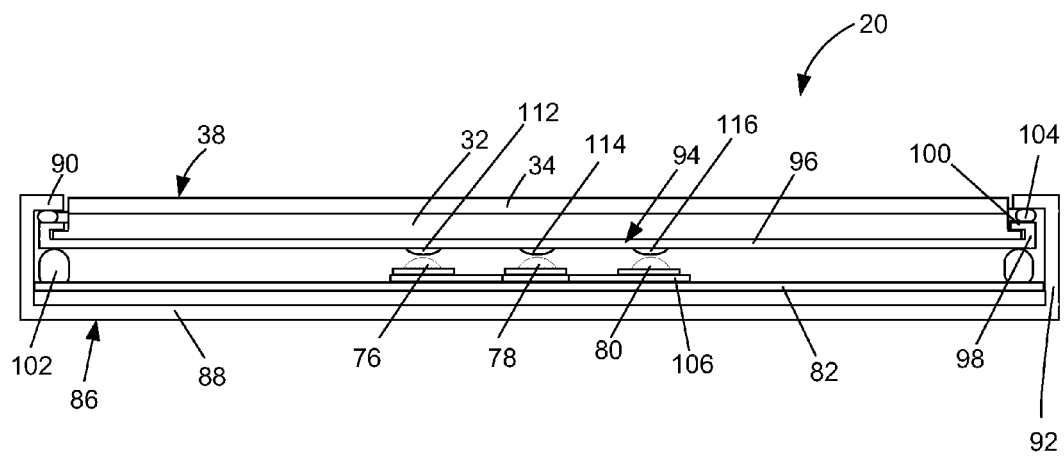
FIG. 6 is a simplified sectional side view of the portable electronic device of FIG. 4.
Figure 7:
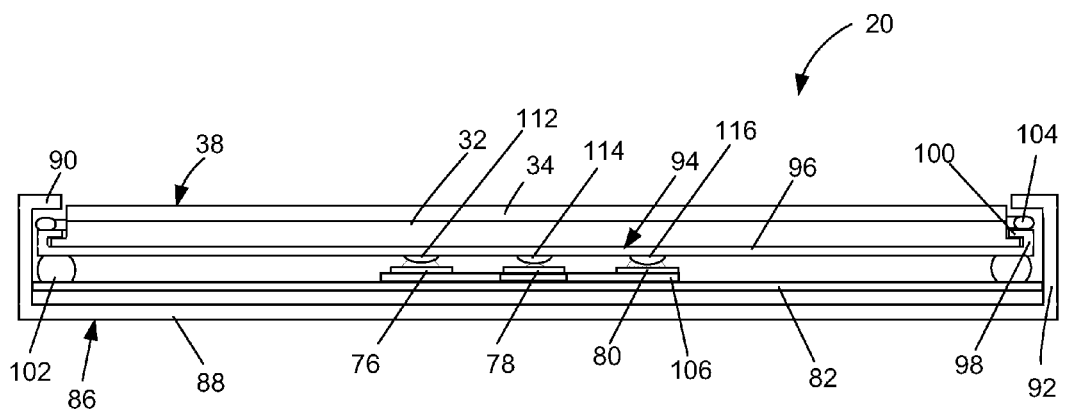
FIG. 7 is a simplified section side view of the portable electronic device of FIG. 6 with the switches in the first position and showing a force applied to a location on the touch-sensitive display.

It will be appreciated that the touch-sensitive display 38 is an assembly of components including, the touch-sensitive overlay 34 overlying the LCD display device 32 and other components including optional components such as a backlight (not shown). The display device 32 of the touch-sensitive display 38 is disposed on a support tray 94 for providing structural support and for inhibiting bending causing damage or breaking of the display device 32 and the touch-sensitive overlay 34 and retained on the support tray 94 in a suitable manner such as by retaining clips. The support tray 94 along with the display device 32 and touch-sensitive overlay 34, are biased away from the base 82, toward the frame 90 in any suitable manner. The support tray 94 can be made from any suitable material such as magnesium and includes a tray platform 96 on which the touch-sensitive display, including the display device 32 and the touch-sensitive overlay 34, is seated. The support tray 94 also includes tray sides 98 and a lip 100. The tray sides 98 extend away from the platform 96, surrounding a portion of the edges of the display device 32 and the touch-sensitive overlay 34, to protect and support the edges of the display device 32 and the touch-sensitive overlay 34 and the lip 100 extends inwardly from each of the tray sides 98. In the portable electronic device 20, the lip 100 is located near the underside of the frame 90, between the frame 90 and the base 82, as shown in FIG. 6, such that the frame 90 maintains the support tray 94, the display device 32 and the touch-sensitive overlay 34 within the housing 86. Thus, the support tray 94, the display device 32 and the touch-sensitive overlay 34, together are moveable within and constrained by the housing 86.

The support tray 94 along with the display device 32 and the touch-sensitive overlay 34, are biased into the rest position shown in FIG. 6 in any suitable manner. In the present example, a pair of biasing elements 102 are disposed on the base 82, proximal short ones of the sidewalls 92 of the housing 86 for biasing the support tray 94 along with the display device 32 and touch-sensitive overlay 34 into the rest position as shown in FIG. 6. A pair of compliant spacers 104, for example, gel pads, can be disposed between the lip 100 of the support tray 94 and the underside of the frame 90.

The support tray 94, the display device 32 and the touch-sensitive overlay 34 together are movable within the housing 86 as a force on the touch-sensitive overlay 34 that is sufficient to overcome the bias, can cause movement of the support tray 94 with the display device 32 and the touch-sensitive overlay 34. For example, an off-center force on the touch-sensitive overlay 34 that is sufficient to overcome the bias and the actuation force of one of the switches 76, 78, 80 can cause pivoting of the support tray 94 along with the display device 32 and the touch-sensitive overlay 34.

The three switches 76, 78, 80 are located between the base 82 and the platform 96 of the support tray 94 for providing additional input and for providing tactile feedback to a user when pressing on the touch-sensitive overlay 34. The switches 76, 78, 80 can be any suitable switches, such as mechanical dome-type switches, located such that displacement of the support tray 94 along with the display device 32 and the touch-sensitive overlay 34 by, for example, pivoting resulting from a user pressing at an off-center location on the touch-sensitive overlay 34 with sufficient force to overcome the bias, actuates a respective one of the switches 76, 78, 80.

Each of the switches 76, 78, 80 is located on a mounting plate 106 that is disposed on the base 82 and is part of a sliding mechanism for moving the switches between positions. The mounting plate 106 can be T-shaped with each of the switches 76, 78, 80 located proximal a respective end of the T-shaped mounting plate 106. Thus, two switches 76, 80 are aligned proximal opposite ends of the cross-member of the T-shaped mounting plate 106 and the other switch 78 is located proximal the end of the base-member of the T-shaped mounting plate 106.

Figure 4:
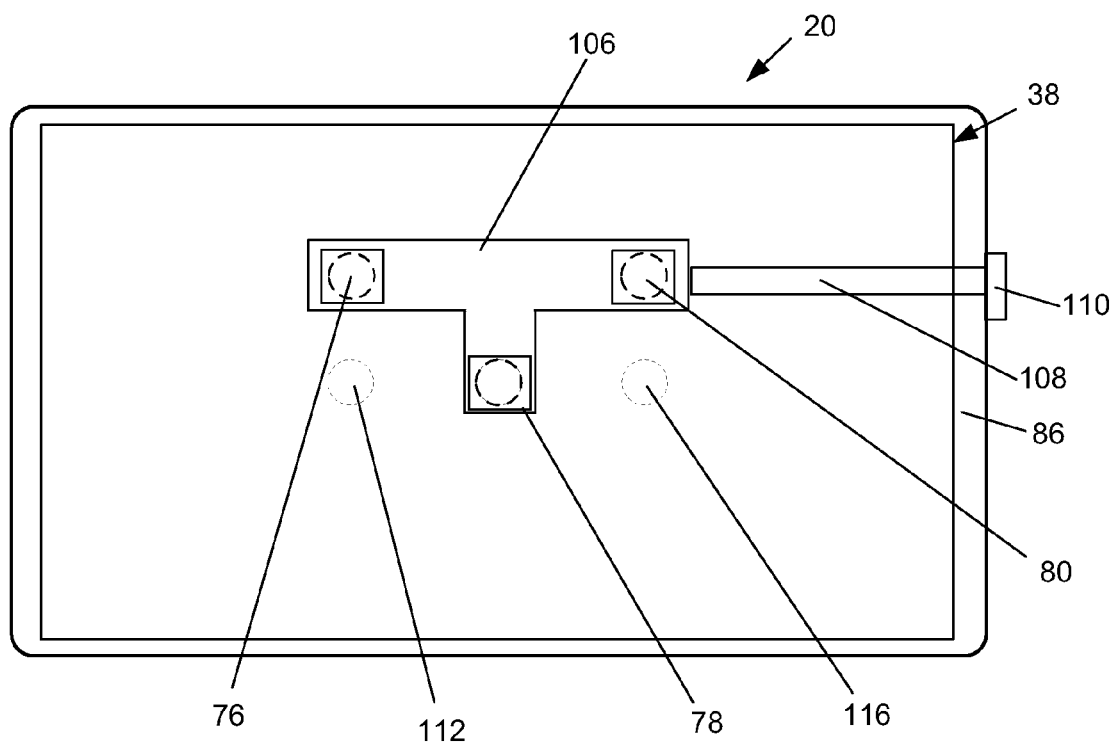
FIG. 4 is top view of the portable electronic device of FIG. 2 showing further hidden detail of the sliding mechanism including switches of FIG. 3A with the switches in a first position.
Figure 5:
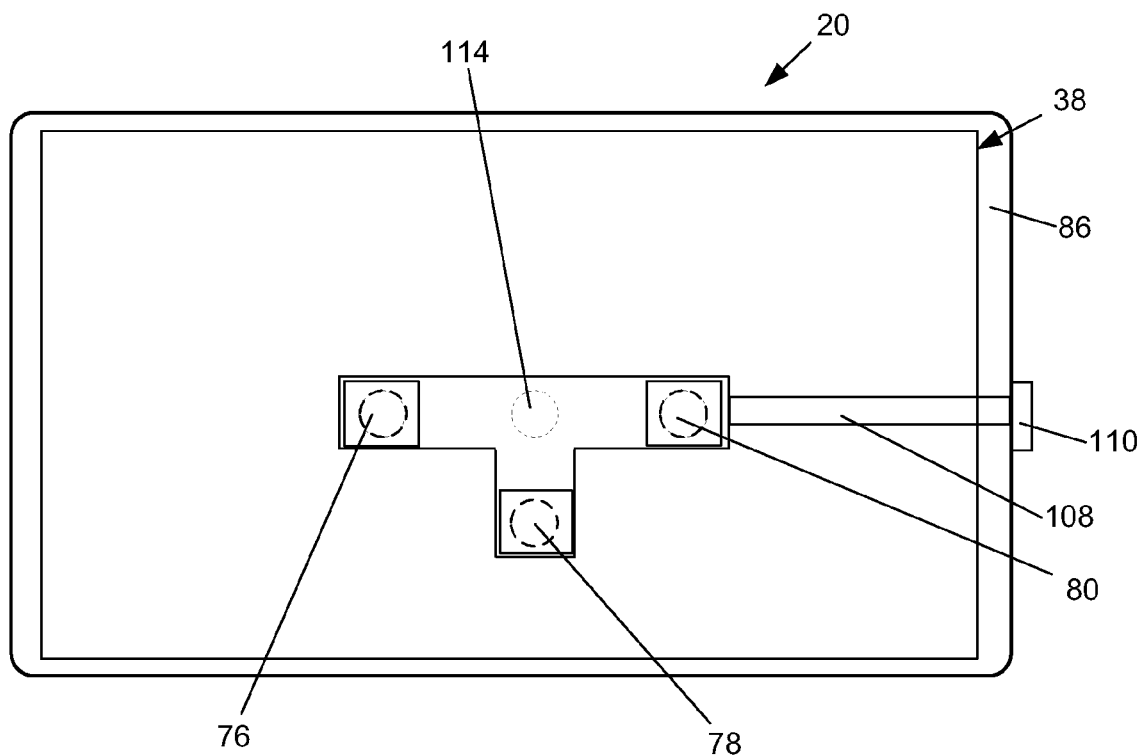
FIG. 5 is a top view of the portable electronic device similar to FIG. 4, with the switches in a second position.

The sliding mechanism can be any suitable mechanism for sliding of the mounting plate 106 between positions as described further below. For example, the sliding mechanism can be a manual sliding mechanism that includes a slide arm 108 connected to the mounting plate 106 and extending to a grip 110 at an exterior of the housing 86 for sliding, as shown in FIGS. 4 and 5. Suitable guides (not shown) can guide the mounting plate 106 and sliding mechanism for sliding between positions. Alternatively, the mounting plate 106 can be connected to, for example, a stepper motor controlled by the processor 22 for automated movement of the mounting plate 106 and the switches 76, 78, 80.

The platform 96 of the support tray 94 includes three, spaced apart, rounded projections 112, 114, 116, each one of the projections 112, 114, 116 for actuation of a respective one of the switches 76, 78, 80. Thus, the support tray 96 also acts as an actuator for actuation of the switches 76, 78, 80. The projections 112, 114, 116 are aligned along a long center line of the portable electronic device 20 with one of the projections 114 extending from the center of the support tray 94 and the other two projections 112, 116 generally equally spaced from the center. The two projections 112, 114 are spaced the same distance apart as the two switches 76, 80 aligned proximal opposite ends of the cross-member of the T-shaped mounting plate 106.

The touch-sensitive display 38 can be any suitable touch-sensitive display. In one embodiment, the touch-sensitive display 38 is a capacitive touch-sensitive display 38. Thus, the capacitive touch-sensitive display 38 includes the display device 32 and the touch-sensitive overlay 34, which in the present example is a capacitive touch-sensitive overlay 34. It will be appreciated that the capacitive touch-sensitive overlay 34 includes a number of layers in a stack and is fixed to the display device 32 via a suitable optically clear adhesive. The layers can include, for example a substrate fixed to the display device 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. Each of the capacitive touch sensor layers can be, for example, a layer of patterned indium tin oxide (ITO)

In the capacitive touch-sensitive overlay example, the X and Y location of a touch event on the touch-sensitive overlay 34 can be determined with the X location determined from a signal generated as a result of capacitive coupling with one of the touch sensor layers and the Y location determined from a signal generated as a result of capacitive coupling with the other of the touch sensor layers. Each of the touch-sensor layers provides a signal to the controller 36 (shown in FIG. 1) as a result of capacitive coupling with a suitable object such as a finger of a user or a conductive object held in a bare hand of a user resulting in a change in the electric field of each of the touch sensor layers. The signals represent the respective X and Y touch location values. It will be appreciated that other attributes of the user's touch on the touch-sensitive display 38 can be determined. For example, the size and the shape of the touch on the touch-sensitive display 38 can be determined in addition to the location (X and Y values) based on the signals received at the controller 36 from the touch sensor layers.

The display device 32 provides graphical representations that are selectable or manipulatable by user interaction with the touch-sensitive overlay 34. The X and Y location of a touch event are both determined based on the signals received at the controller 36 from the touch-sensitive overlay 34. User-selected input is determined based on the X and Y location of the touch and the application executed by the processor 22. Thus a feature or virtual button displayed on the touch-sensitive display 38 may be selected by matching the feature or button to the X and Y location of a touch event on the touch-sensitive display 38.

Referring in particular to FIGS. 4 and 5, the switches 76, 78, 80 are moveable on the mounting plate 106 of the sliding mechanism, from a first position shown in FIG. 4 to a second position shown in FIG. 5. In the first position, the switch 78 at the end of the base member of the T-shaped mounting plate 106 is centered with respect to the support tray 94 and located between the center projection 114 and the base 82. Thus, user-application of a force on the touch-sensitive display 38 by pressing on the touch-sensitive overlay 34 with sufficient force to overcome the bias and cause movement of the support tray 94, display device 32 and touch-sensitive overlay 34 with respect to the base results in actuation of the switch 78. Movement of the support tray 94, display device 32 and touch-sensitive overlay 34 toward the base 82 when the switches 76, 78, 80 are in the first position, causes the central projection 114 to contact and depress the switch 78.

When the switches 76, 78, 80 are in the first position, the two switches 76, 80 that are aligned proximal opposite ends of the cross-member of the T-shaped mounting plate 106 are not actuated as a result of user-application of a force on the touch-sensitive display 38. These two switches 76, 80 are not aligned with any of the projections 112, 114,116 and therefore are not actuated as a result of movement of the support tray 94, display device 32 and touch-sensitive overlay 34 with respect to the base 82. The support tray 94, display device 32 and touch-sensitive overlay 34 can pivot or can be moved toward and generally parallel to the base 82 causing actuation of the switch 78, for example, moving from the position shown in FIG. 6 to that shown in FIG. 7.

In the second position, the two switches 76, 80 that are aligned proximal opposite ends of the cross-member of the T-shaped mounting plate 106 are aligned with the two projections 112, 116 that are generally equally spaced from the center of the support tray 94. Thus, each switch 76, 80 is located between a respective one of the two projections 112, 116 and the base 82. The switch 78 at the end of the base member of the T-shaped mounting plate 106 is not aligned with the center projection 114 when the switches 76, 78, 80 are in the second position.

User-application of a force on the touch-sensitive display 38 by pressing on the touch-sensitive overlay 34 with sufficient force to overcome the bias and cause movement of the support tray 94, display device 32 and touch-sensitive overlay 34 with respect to the base results in actuation of one of the switches 76, 80. Movement of the support tray 94, display device 32 and touch-sensitive overlay 34 toward the base 82 when the switches 76, 78, 80 are in the second position, causes one of the projections 112,116 to contact and depress the respective one of the switches 76, 80.

Figure 8:
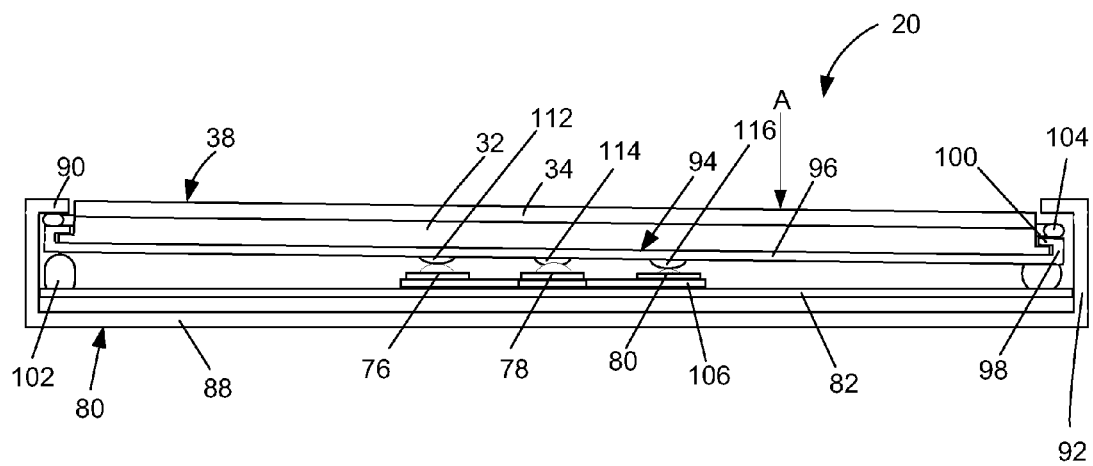
FIG. 8 is a simplified sectional side view similar to FIG. 7, with the switches in a second position and a force applied to a location on the touch-sensitive display.

Referring now to FIG. 8, the switches 76, 78, 80 are in the second position. User application of a force by pressing on the touch-sensitive overlay 34 at an off-center location, as exemplified by the arrow labeled "A" in FIG. 8, for selection of a feature, key or button, for example, on the touch-sensitive display 38 can result in pivoting of the support tray 94, display device 32 and touch-sensitive overlay 34. In the example of FIG. 8, the force is applied on the right-hand side in the orientation shown in the Figure. Thus, the support tray 94 pivots such that the right-hand side of the support tray 94, display device 32 and touch-sensitive overlay 34 is moved toward the base 82. The switch 80, shown on the right-hand side in FIG. 8 is thus actuated by the respective projection 116.

As described above, user application of a first force to overcome the bias and cause movement of the support tray 94, display device 32 and touch-sensitive overlay 34 with respect to the base results in actuation of one of the switches 76, 80. Movement of the support tray 94, display device 32 and touch-sensitive overlay 34 toward the base 82 when the switches 76, 78, 80 are in the second position, causes one of the projections 112, 116 to contact and depress the respective one of the switches 76, 80. With continued application of the first force, user application of a second force to overcome the bias and cause further movement of the support tray 94, display device 32 and touch-sensitive overlay 34 with respect to the base results in actuation of the other of the switches 76, 80.

Figure 9:
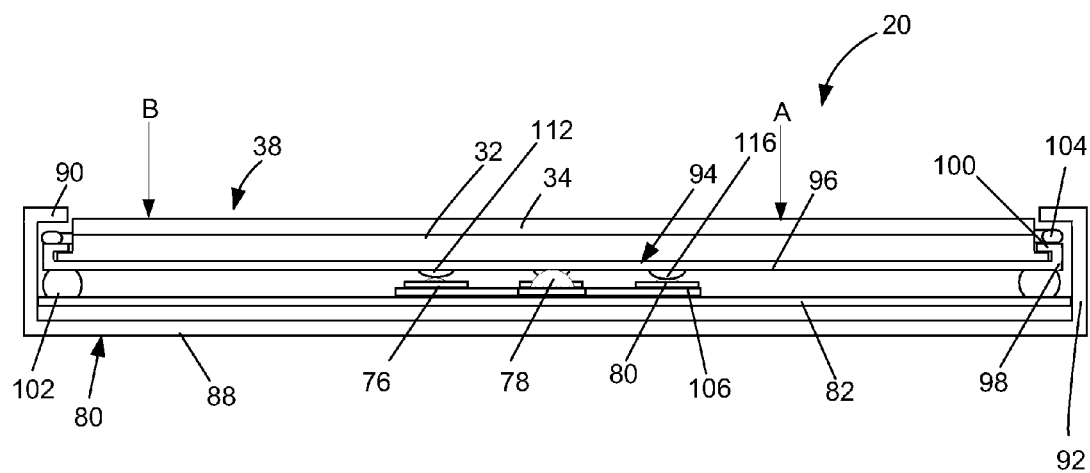
FIG. 9 is a simplified sectional side view similar to FIG. 8, with the switches in a second position and a second force applied to a location on the touch-sensitive display.

Referring now to FIG. 9, user application of the first force by pressing on the touch-sensitive overlay 34 at an off-center location, as depicted by the arrow labeled "A", results in pivoting of the support tray 94, display device 32 and touch-sensitive overlay 34 and actuation of the switch 80. With continued application of the force at the off-center location as depicted by the arrow labeled "A" in FIG. 9, a second force is applied by pressing on the touch-sensitive overlay 34 at a second location, as exemplified by the arrow labeled "B" in FIG. 9 for selection of a second feature, key or button, for example on the touch-sensitive display 38. The support tray 94, display device 32 and touch-sensitive overlay 34 pivot as a result of the second force such that the switch 76 is actuated by the respective projection 112.

Rather than actuating the switch 80 first, a force applied to the touch-sensitive overlay 34 can result in actuation of the switch 76 first and a second force can result in actuation of the switch 80, depending on the location of application of the force.

When selecting a sequence of multiple virtual features, keys or buttons, for example, during typing on a keyboard on the touch-sensitive display 38, depression of the support tray 94, display device 32 and touch-sensitive overlay 34 can occur as a result of, for example, a thumb depressing the touch-sensitive display to select a key of a virtual keyboard, prior to lifting the opposite thumb from selection of a previous button on the touch-sensitive display. Thus, there may be an overlap in time during which both thumbs contact and depress the support tray 94, display device 32 and touch-sensitive overlay 34. The two switches 76, 80 can provide the user with tactile feedback when depressing the support tray 94, display device 32 and touch-sensitive overlay 34 to select a key even when support tray 94, display device 32 and touch-sensitive overlay 34 are still depressed from selection of a previous key. Thus, tactile feedback is provided for each selection.

Figure 10:
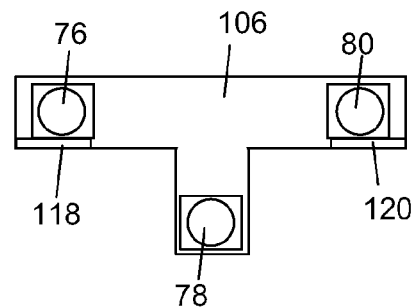
FIG. 10 is a top view of a portion of a sliding mechanism including switches of a portable electronic device according to another embodiment.
Figure 11:
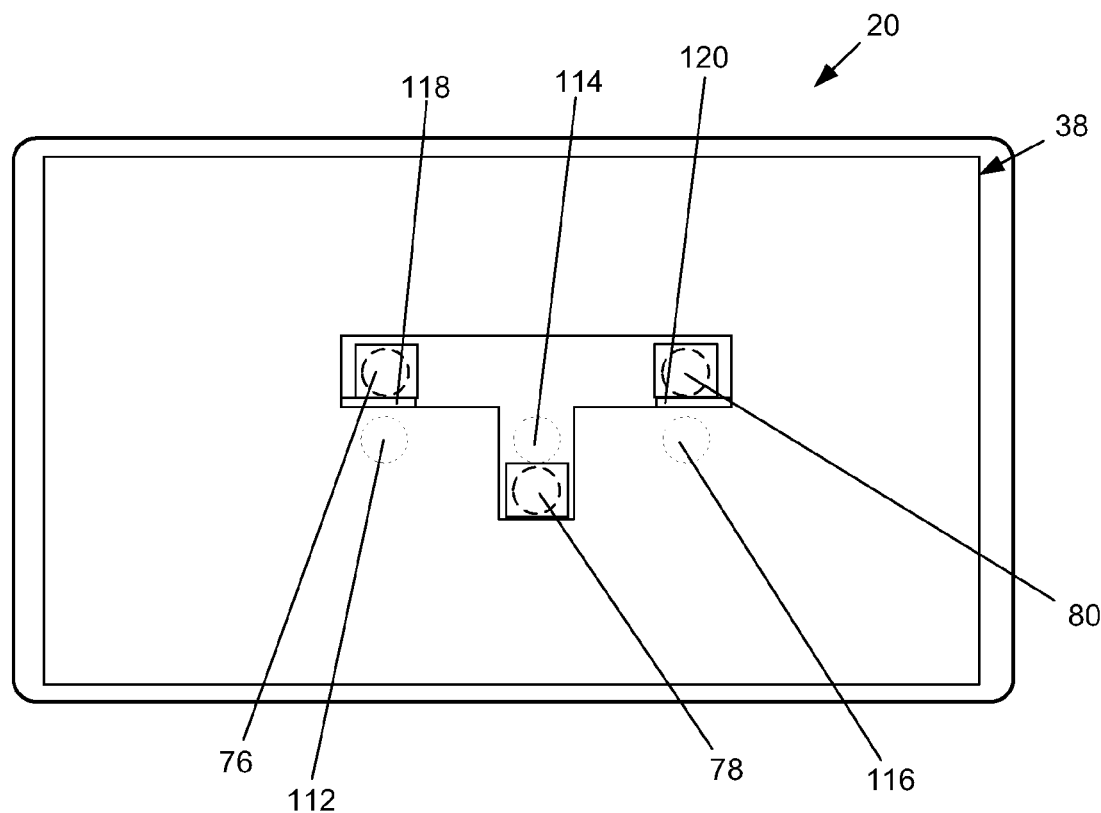
FIG. 11 is top view of the portable electronic device showing hidden detail of the sliding mechanism including switches of FIG. 10 with the switches in a third position.
Figure 12:
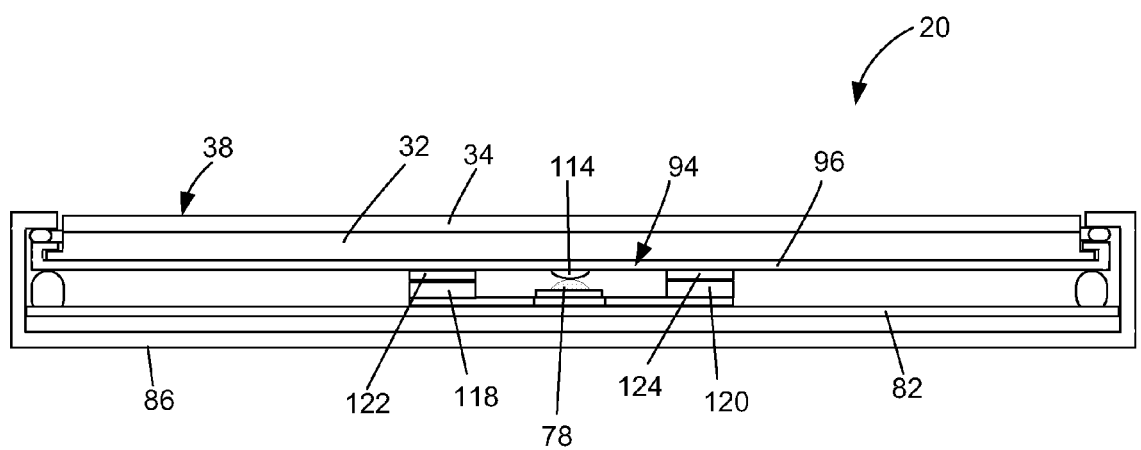
FIG. 12 is a simplified sectional side view of the portable electronic device of FIG. 11, showing the switches in the third position.

Referring now to FIGS. 10, 11 and 12, there is shown another embodiment of the portable electronic device 20. The present embodiment includes many similar features to that shown and described in reference to FIGS. 2 to 9 and therefore these features are not further described herein. In the present embodiment, the mounting plate 106 of the sliding mechanism includes a pair of stop members 118, 120, with each of the stop members 118, 120 adjacent a respective one of the switches 76, 80 that are aligned proximal opposite ends of the cross-member of the T-shaped mounting plate 106. The stop members 118, 120 can each be generally rectangular parallelepiped members protruding from the remainder of the mounting plate 106 and located adjacent the respective switches 76, 80 as shown in FIG. 10. Complementary bosses 122, 124 extend from the underside of the platform 96 of the support tray 94. Each boss is located adjacent a respective one of the projections 12, 116 that are spaced from the center. The stop members 118, 120 and complementary bosses 122, 124 are located such that each stop member 118, 120 abuts a respective one of the complementary bosses 122, 124 when the switches 76, 78, 80 are located between the first position in which only one of the switches 76, 78, 80 is located for actuation by the switch actuator, and the second position in which two of the switches 76, 78, 80 are located for actuation by the switch actuator. Thus, a third position is provided for locking the support tray 94, display device 32 and touch-sensitive overlay 34. The third position is located between the first and second positions, in which the stop member 118,120 and respective bosses 122, 124 abut, inhibiting movement of the support tray 94, display device 32 and touch-sensitive overlay 34 toward the base 82. The switches 76, 78, 80 are therefore not actuatable when in the third position. FIGS. 11 and 12 show the switches 76, 78, 80 on the mounting plate 106 in the third position, between the first and second positions.

Figure 13:
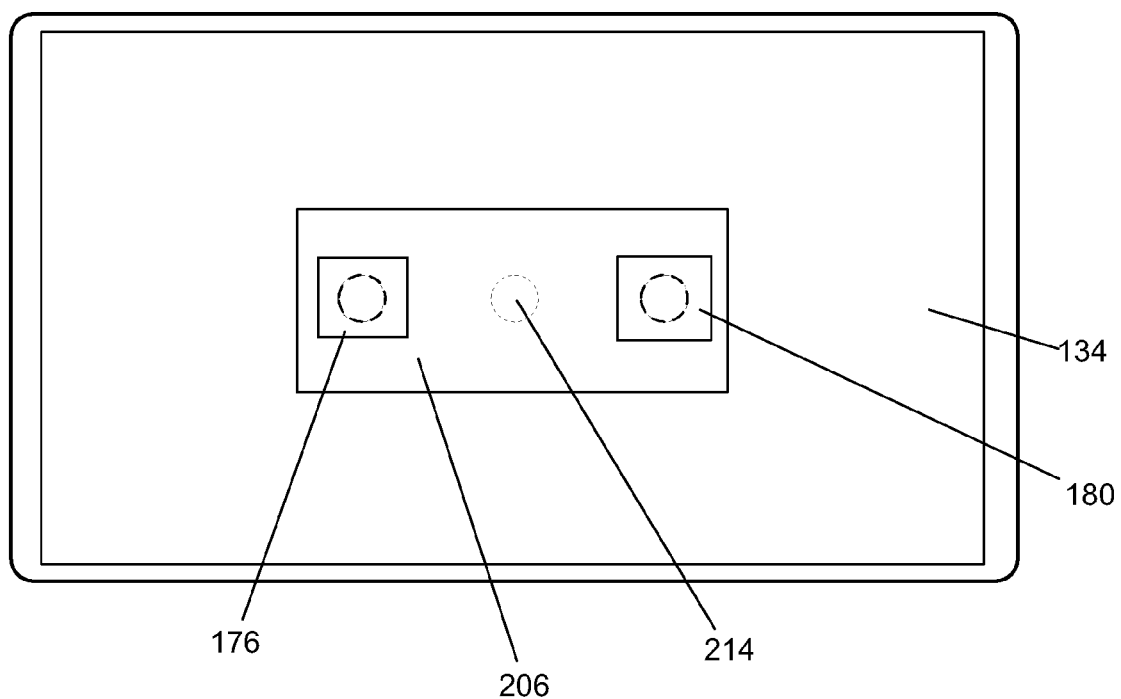
FIG. 13 is top view of a portable electronic device according to another embodiment, showing hidden detail of a sliding mechanism including switches in a second position.
Figure 14:
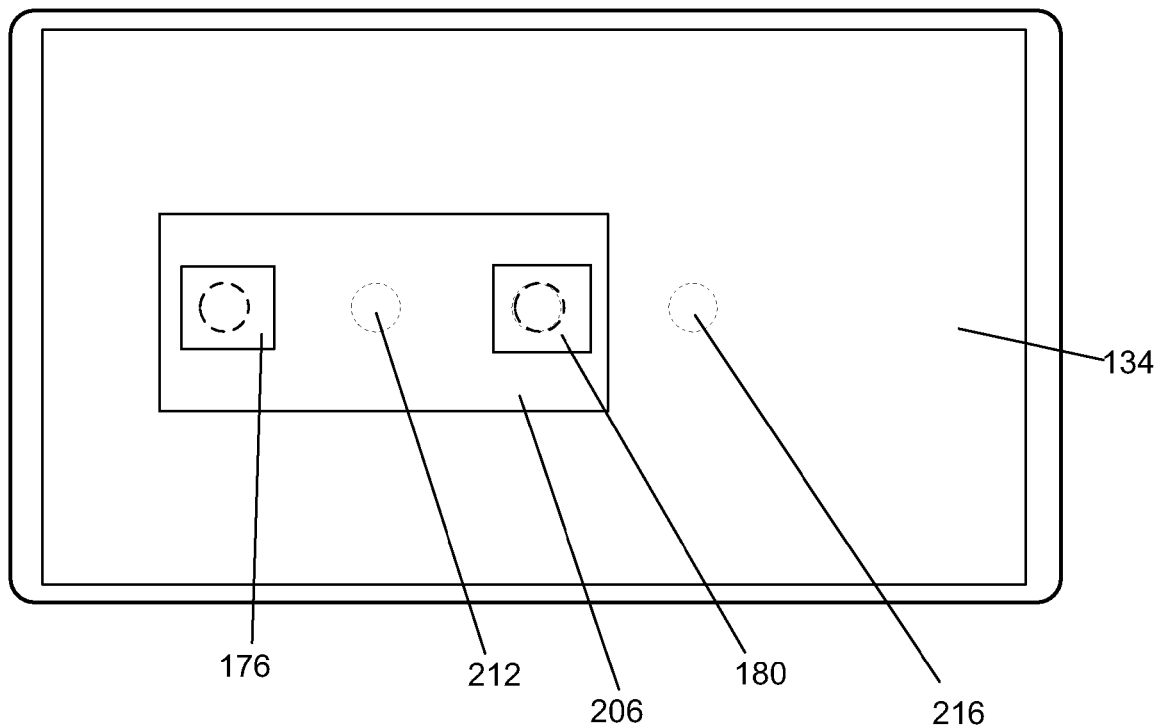
FIG. 14 is top view of a portable electronic device according to the embodiment of FIG. 13, showing hidden detail of a sliding mechanism including switches in a first position.

Reference is now made to FIGS. 13 and 14 to describe another embodiment. Reference numerals used in describing the previous embodiments will again be used, raised by 100 where the reference numerals denote similar features. Many of the remaining features are similar to those already described herein and are therefore not explained again in detail.

In the present example, only two switches 176, 180 are located between the base and the platform of the support tray for providing additional input and for providing tactile feedback to a user when pressing on the touch-sensitive overlay 134. Again, the switches 176, 180 can be any suitable switches, such as mechanical dome-type switches, located such that displacement of the support tray along with the display device and the touch-sensitive overlay 134 by, for example, pivoting resulting from a user pressing at an off-center location on the touch-sensitive overlay 134 with sufficient force to overcome the bias, actuates a respective one of the switches 176, 180.

The two switches 176, 180 are located on a mounting plate 206 that is disposed on the base and is part of a sliding mechanism for moving the switches between positions. The mounting plate 206 can be any suitable shape and, in the present embodiment is generally rectangular with each of the switches 176, 180 located proximal a respective end of the generally rectangular mounting plate 206. Thus, the two switches 176, 180 are aligned proximal opposite ends of the rectangular mounting plate 206.

Again, the sliding mechanism can be any suitable mechanism for sliding of the mounting plate 206 between positions as described further below. For example, the sliding mechanism can be a manual sliding mechanism that includes a slide arm (not shown) connected to the mounting plate 206. Suitable guides (not shown) can guide the mounting plate 206 and sliding mechanism for sliding between positions. Alternatively, movement of the mounting plate 206 can be automated based on, for example, device state or application.

The platform of the support tray includes three, spaced apart, rounded projections 212, 214, 216, the projections 212, 214, 216 for actuation of the switches 176, 180. The projections 212, 214, 216 are aligned along a long center line of the portable electronic device with one of the projections 214 extending from the center of the support tray and the other two projections 212, 216 generally equally spaced from the center. The two projections 212, 214 are spaced the same distance apart as the two switches 176, 180.

Referring in particular to FIGS. 13 and 14, the switches 176, 180 are moveable on the mounting plate 206 of the sliding mechanism, from a first position shown in FIG. 14 to a second position shown in FIG. 13. In the first position, a single switch, namely, the switch 180 is centered with respect to the support tray and located between the center projection 214 and the base for actuation by the center projection 214. Thus, user-application of a force on the touch-sensitive overlay 134 sufficient force to overcome the bias and cause movement of the support tray, display device and touch-sensitive overlay 134 with respect to the base results in actuation of the switch 180 as the central projection 214 contacts and depresses the switch 180. The switch 176, however, is not aligned with any of the projections 212, 214, 216 and is not actuated.

When the switches 176, 180 are in the second position, each of the two switches 176,180 is aligned with a respective one of the two projections 212, 216 that are generally equally spaced from the center of the support tray. Thus, each switch 176, 180 is located between a respective one of the two projections 212, 216 and the base for actuating. The two switches 176, 180 can be actuated in a similar manner to the actuation of the switches 76, 80 as described above with reference to FIGS. 2 to 9.

Figure 15:
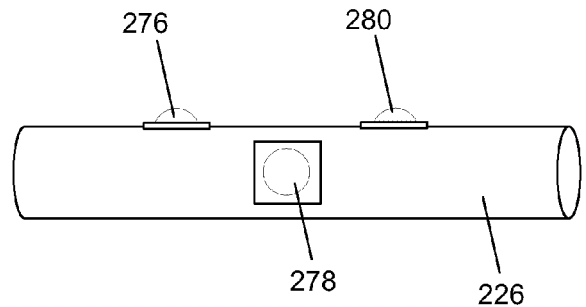
FIG. 15 is a perspective view of a portion of a rotating mechanism including switches of a portable electronic device according to yet another embodiment.

Reference is now made to FIG. 15 to describe a portion of a portable electronic device according to yet another embodiment. Rather than a sliding mechanism as described above, in the present embodiment, three switches 276, 278, 280 are provided on a rotating mechanism including a rotatable shaft 226. As shown, two of the switches 276, 280 are aligned on one side of the shaft 226. The switches 276 280 are spaced apart a distance equal to a distance of spaced apart actuators on an underside of the platform of the support tray. The third switch 278 is located on another position on the shaft 226, shown in FIG. 15 at a position approximately 90 degrees from the two switches 276, 280. In the present embodiment, the switches 276, 278, 280 can be moved from a first position in which the switch 278 is aligned with a central projection from the platform of the support tray for actuation to a second position in which the two switches 276, 280 are each aligned with respective spaced apart projections from the platform of the support tray for actuation.

Figure 16:
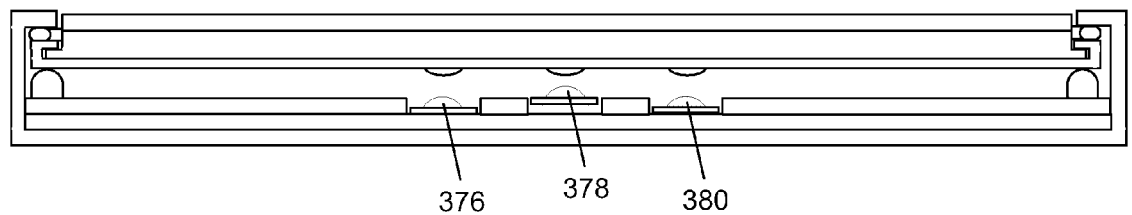
FIG. 16 is a simplified sectional side view of a portable electronic device according to still another embodiment.

FIG. 16 shows yet a further embodiment of the electronic device. In the embodiment of FIG. 16, the switches 376, 378, 380 are movable from a first position to a second position by electromagnets for holding the switches 376, 378, 380 in place during use for actuation. In the present embodiment, each one of the switches 376, 378, 380 can be moved independently of the other ones of the switches 376, 378, 380 and the movement is controlled by electromagnets.

While the embodiments described herein are directed to particular implementations of the touch-sensitive display and the portable electronic device, it will be understood that modifications and variations to these embodiments are within the scope and sphere of the present disclosure. Also, the Figures depict examples of the portable electronic device and other shapes and configurations are possible. It will be appreciated that the size and shape of many of the features can differ while still providing the same function. It will also be appreciated that similar functions can be carried out in alternative embodiments. For example, the guide pins are described in the above examples as extending from the support tray. Alternatively, the guide pins can extend from the base, for example.

According to one aspect there is provided an electronic device. The electronic device includes a base and a touch-sensitive display connected to the base and movable relative thereto. The touch-sensitive display includes a display device and a touch-sensitive input device for detecting touches on the display device. The electronic device also includes a switch actuator disposed between the touch-sensitive display and the base, switches disposed between the touch-sensitive display and the base and moveable relative to the switch actuator from a first position in which only one of the switches is located for actuation by the switch actuator, and a second position in which two of the switches are located for actuation by the switch actuator, and operational components including a processor connected to the display device and the touch-sensitive input device for controlling operation of the display device and the touch-sensitive input device.

The mechanical switches and the touch-sensitive display that is moveable with respect to the base provides the user with a desirable tactile feedback during a touch event as sufficient force applied on the touch-sensitive display to overcome the bias into the rest position can result in movement of the touch-sensitive display and actuation of one of the switches. When selecting a sequence of multiple virtual buttons, for example, during typing on the touch-sensitive display, depression of the touch-sensitive display may occur as a result of, for example a thumb depressing the touch-sensitive display to select a virtual button, prior to lifting the opposite thumb from selection of a previous button on the touch-sensitive display. Thus, there is an overlap in time during which both thumbs contact and depress the touch-sensitive display. Two switches can be used to provide the user with tactile feedback when depressing the touch-sensitive display to select a button when the touch-sensitive display is still depressed from selection of a previous button. Further, tactile feedback can be provided when lifting either or both thumbs from the touch-sensitive display. During use of the electronic device in, for example, applications in which a keyboard is not employed, a single switch is preferable as actuation of a single switch provides tactile feedback. Thus, only a single tactile response is provided to the user even if, for example, excessive force is applied during a touch event on the touch-sensitive display. The ability to change between a position in which only a single switch can be actuated and a second position in which two switches can be actuated provides desirable tactile feedback during use in different device modes or applications. Thus, feedback is provided for positively indicating input permitting the user to discern when an intended input has been received and reducing chances of erroneous input at the device, for example, by additional or double input.

Many other modifications and variations may occur to those skilled in the art. All such modifications and variations are believed to be within the sphere and scope of the present disclosure.

What is claimed is:

1. An electronic device, comprising:
   a base;
   a touch-sensitive display connected to the base and movable relative thereto;
   a switch actuator disposed between the touch-sensitive display and the base;
   switches disposed between the touch-sensitive display and the base and moveable relative to the base from a first position in which only one of the switches is located for actuation by the switch actuator to a second position in which two of the switches are located for actuation by the switch actuator;
   wherein the switch actuator comprises a tray disposed between the touch-sensitive display and at least one of the switches; and
   wherein the switch actuator comprises at least one projection from the tray for contacting the switches.

2. The electronic device according to claim 1, wherein the switch actuator comprises three projections for actuating the switches.

3. The electronic device according to claim 1, comprising a sliding mechanism that comprises a mounting plate on which the switches are disposed, and the mounting plate is slideable between the first position and the second position.

4. The electronic device according to claim 3, comprising a stop for inhibiting movement of the touch-sensitive display relative to the base.

5. The electronic device according to claim 3, wherein the stop is aligned with a boss for abutting to inhibit movement of the touch-sensitive display relative to the base when the switches are in a third position.

6. The electronic device according to claim 5, wherein the third position is intermediate the first position and the second position.

7. The electronic device according to claim 1, wherein at least one of the switches provides tactile feedback in response to a touch event on the touch-sensitive display.

8. An electronic device, comprising:
   a movable touch-sensitive display;

a switch actuator disposed between the touch-sensitive display and a housing of the electronic device;

switches moveable relative to a base of the electronic device from a first position in which one of the switches is located for actuation by the switch actuator to a second position in which two of the switches are located for actuation by the switch actuator;

wherein movement of the touch-sensitive display depresses any switches located for actuation by the switch actuator;

comprising a sliding mechanism for moving the switches between the first position and the second position; and wherein the sliding mechanism is controlled by a processor to move between the first and the second position.

9. The electronic device according to claim 8, wherein at least one of the switches provides tactile feedback in response to a touch event on the touch-sensitive display.

10. The electronic device according to claim 8, wherein relative movement of the switches is automated.

11. The electronic device according to claim 8, wherein relative movement of the switches is automated based on at least one of a device state and an application running on the device.

12. An electronic device, comprising:

a housing;

a display movable relative to the housing;

a switch actuator disposed between the display and the housing;

a plurality of switches moveable relative to a base of the electronic device from a first position to a second position to change a number of the plurality of switches that are located for actuation by the switch actuator;

wherein any of the plurality of switches located for actuation by the switch actuator are actuatable by movement of the display;

comprising a sliding mechanism for moving the switches between the first position and the second position; and wherein the sliding mechanism is controlled by a processor to move between the first and the second position.

13. The electronic device according to claim 12, wherein at least one of the switches provides tactile feedback in response to a touch event on the touch-sensitive display.

* * * * *